Figure 1:
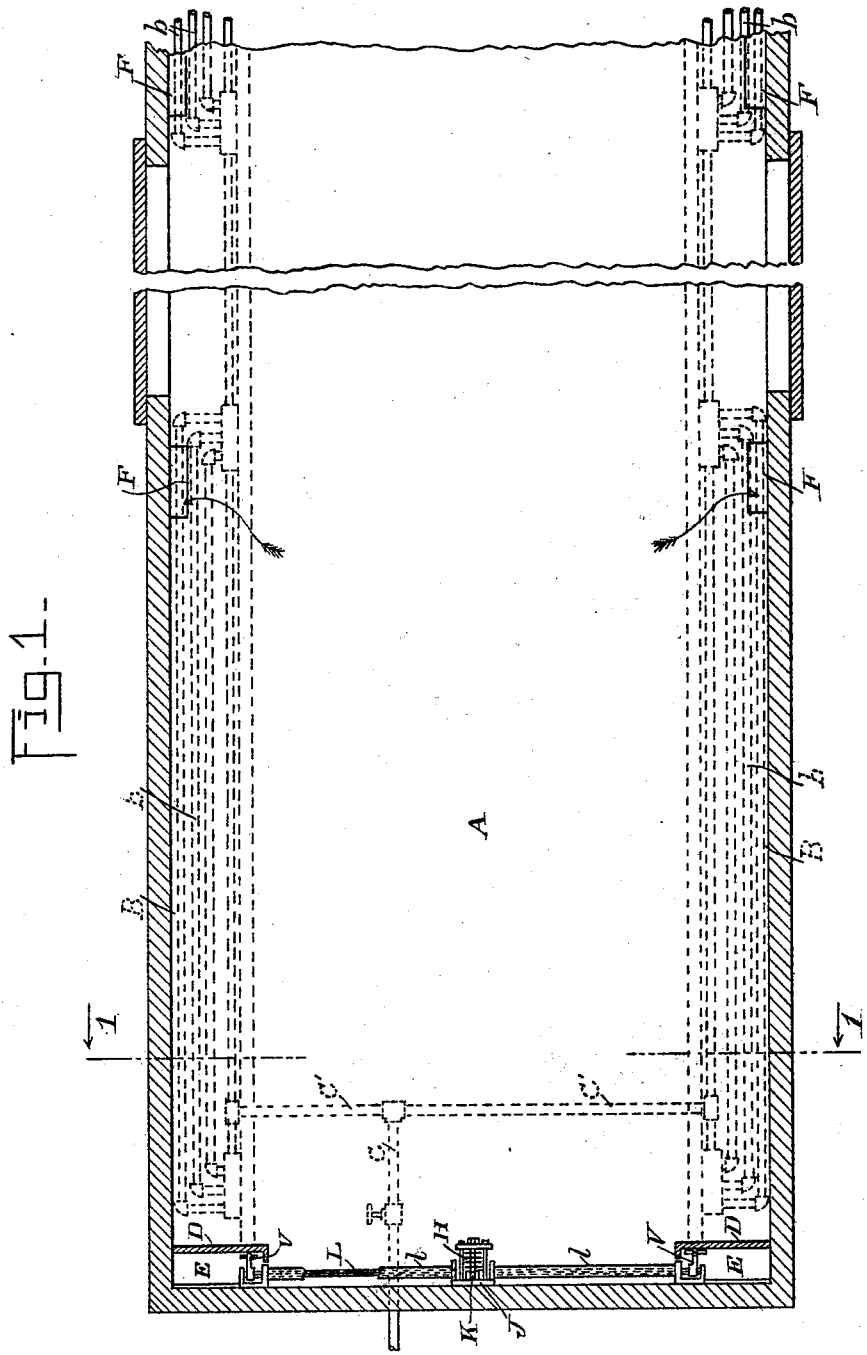

(No Model.) 4 Sheets—Sheet 1.

J. F. McELROY.
SYSTEM FOR WARMING FRUIT CARS.

No. 516,356. Patented Mar. 13, 1894.

Witnesses:
John W. Fisher
Grace T. Many

Inventor,
James F. McElroy.
by Ward Cameron.
Attorneys (No Model.) 4 Sheets—Sheet 2.
J. F. McELROY.
SYSTEM FOR WARMING FRUIT CARS.
No. 516,356. Patented Mar. 13, 1894.
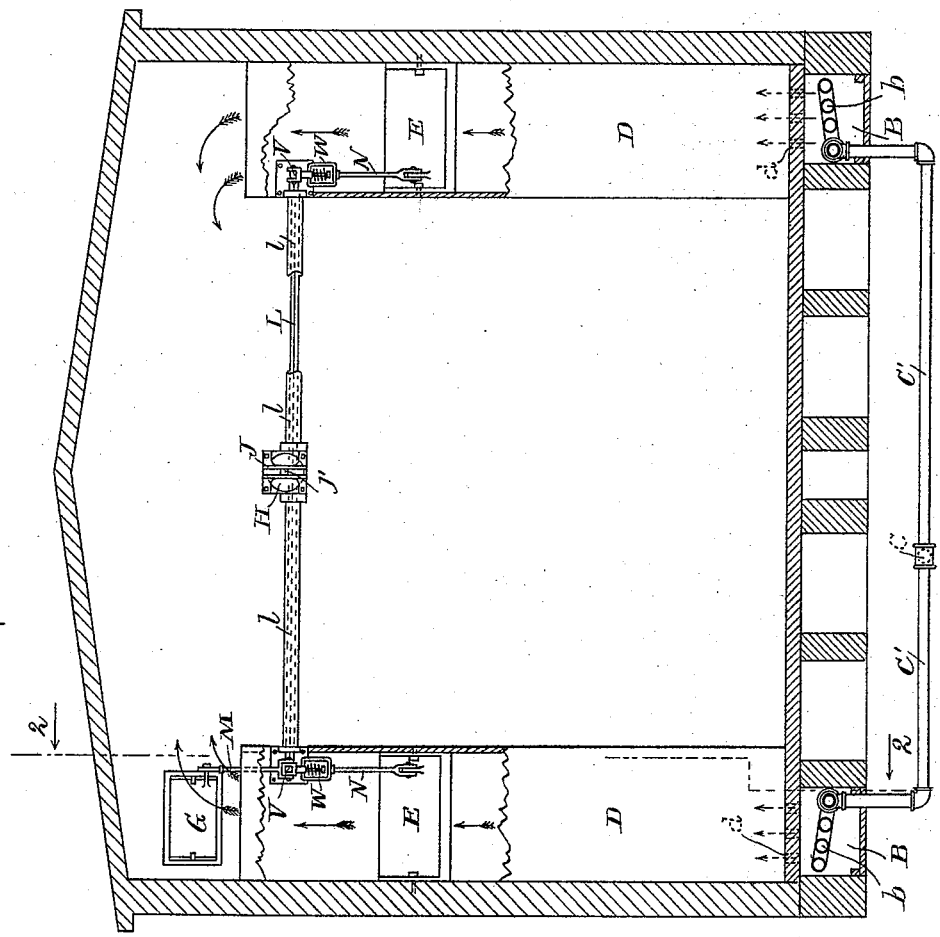
Fig. 2. Sec.1.1.
Witnesses=
John W. Fisher
Grace T. Many
Inventor
James F. McElroy
by Ward & Cameron
Attorneys (No Model.) 4 Sheets—Sheet 3.
J. F. McELROY.
SYSTEM FOR WARMING FRUIT CARS.
No. 516,356. Patented Mar. 13, 1894.
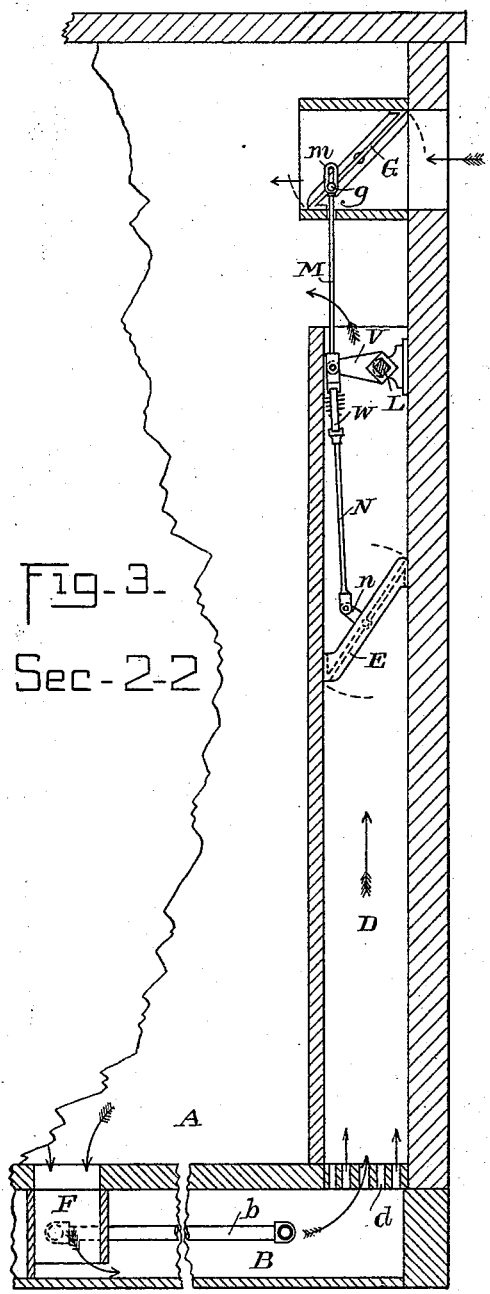
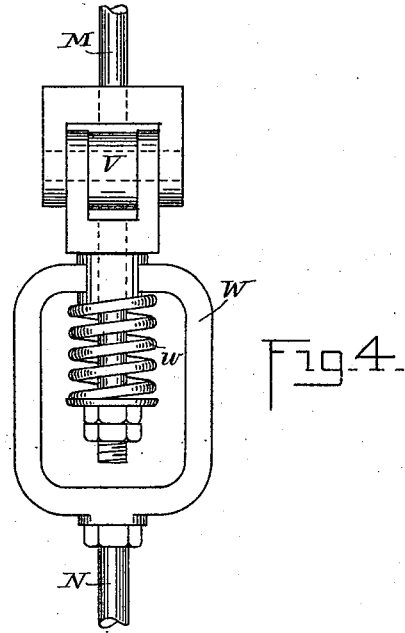
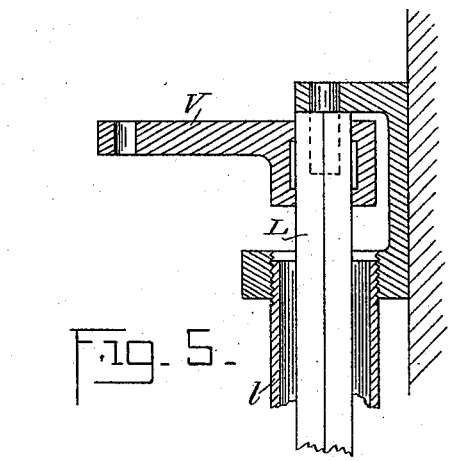
Witnesses:
John W. Fisher
Grace T. Many
Inventor,
James F. McElroy
by Ward & Cameron
Attorneys (No Model.) 4 Sheets—Sheet 4.
J. F. McELROY.
SYSTEM FOR WARMING FRUIT CARS.
No. 516,356. Patented Mar. 13, 1894.
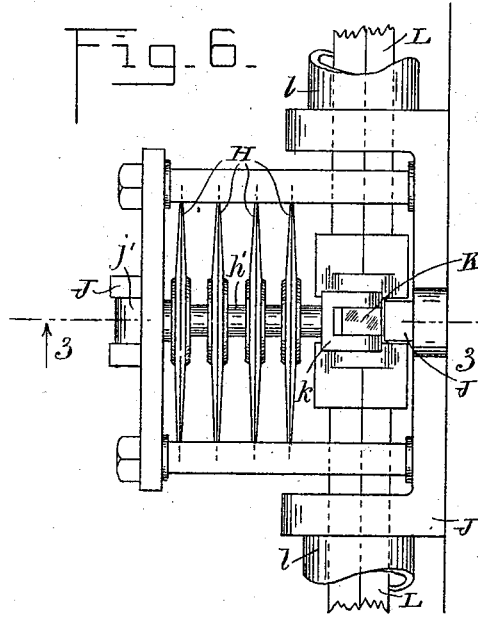
Fig. 6.
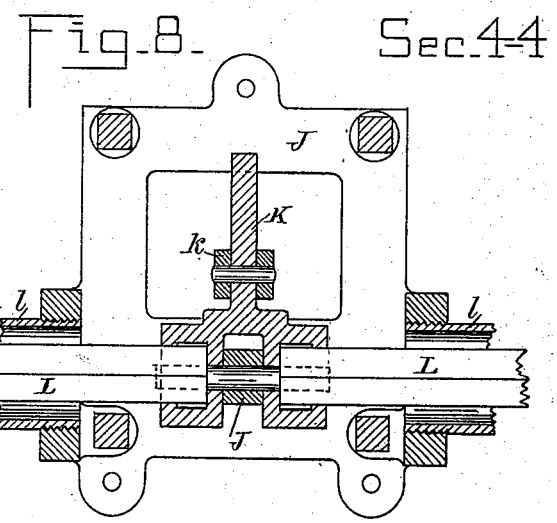
Fig. 8. Sec. 4-4
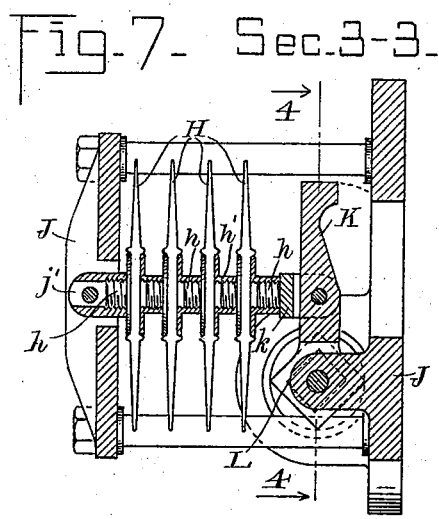
Fig. 7. Sec. 3-3.
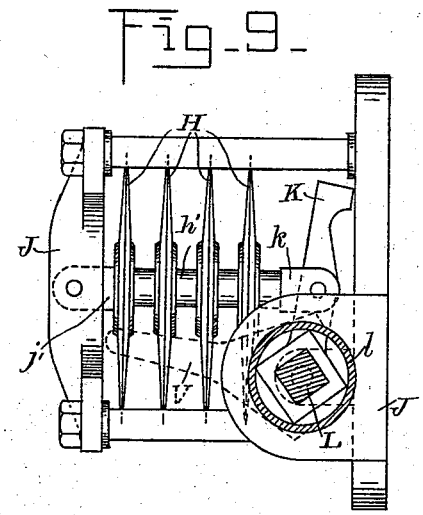
Fig. 9.
Witnesses:
John W. Fisher
Grace T. Many
Inventor
James F. McElroy
by Ward & Cameron
Attorneys

UNITED STATES PATENT OFFICE.

JAMES F. McELROY, OF ALBANY, NEW YORK, ASSIGNOR TO THE CONSOLIDATED CAR-HEATING COMPANY, OF WHEELING, WEST VIRGINIA.

SYSTEM FOR WARMING FRUIT-CARS.

SPECIFICATION forming part of Letters Patent No. 516,356, dated March 13, 1894.

Application filed April 10, 1893. Serial No. 469,699. (No model.)

*To all whom it may concern:*

Be it known that I, JAMES F. MCELROY, a citizen of the United States, residing in the city and county of Albany, State of New York, have invented a new and useful Fruit-Car-Heating System, of which the following is a specification.

My invention relates to improvements in car-heating systems; and the objects of my invention are to produce a system for heating cars containing fruit, vegetables, or other perishable commodities in such a manner that the heating agent shall not be within the car, and the temperature may be maintained at such a degree to prevent injury to fruit and vegetables within the car. I attain these objects by means of the mechanism illustrated in the accompanying drawings, in which—

Figure 1 is a plan. Fig. 2 is a vertical section along the lines 1—1 on Fig. 1. Fig. 3 is a section along the lines 2—2 on Fig. 2. Fig. 4 is an enlarged detail view of the buckle W. Fig. 5 is a detail view in section of the crank arm V and connections. Fig. 6 is a plan of the diaphragms. Fig. 7 is a section along the lines 3—3 on Fig. 6. Fig. 8 is a section along the lines 4—4 on Fig. 7, and Fig. 9 is a view of the diaphragms in an expanded condition.

Similar letters refer to similar parts throughout the several views.

A car containing fruit and vegetables should be warmed to about 50° Fahrenheit, and the temperature within the car can vary but a few degrees either way without doing great damage. It is extremely difficult to keep all portions of a car at the required temperature when the heating pipes or stove are placed within the car; that portion of the fruit that is near the source of heat will become too warm and that that is farthest away too cold. By my system, the steam pipes are placed without the car and the heating apparatus is so arranged that an equable temperature may be maintained throughout the whole car.

In my fruit car-heating system, I place a series of pipes $b$ suitably connected up within a hot air chamber B, constructed beneath the car A on each side and near each end thereof, said piping connected with the train pipe C by means of the connecting pipes C' C'. Within the car at each corner thereof and communicating usually by a series of perforations $d$ or a register with the hot air chamber B, I construct a hot air box D extending sufficiently high to be above the merchandise in the car—open at the top communicating with the interior of the car. The hot air box D is small and stands in the corner of the car and limits the capacity of the car a very small degree. The hot air box D is provided with a damper or valve E. When the valve E is open, the hot air from the hot air chamber B will pass upward through the hot air box D into the upper portion of the car. When the valve E is closed, the circulation of the hot air through the hot air box is prevented.

Within the car and usually on each side of the door, I arrange a cold air duct F leading downward, communicating with the hot air chamber B near the bottom thereof, opening into the car at its upper end, through which the cold air from the car descends, forced downward by the hot air entering the car from the hot air box D and passes into the hot air chamber B, where it is warmed. Thus there is established a current of air from each corner of the car toward the center and downward through the heating chamber B and upward through the hot air box D, diffusing the hot air through all portions of the car, making a gentle and equable temperature throughout its whole extent and without bringing the steam pipes or the hot air immediately after leaving said pipes in contact with any portion of the contents of the car. The position of the cold air duct F on each side of the door is not at all arbitrary. That place is assigned because they are there very much more out of the way of the freight and convenient for communication with the hot air chambers B. In order to prevent a reversal of the current from the hot air chamber through the cold air ducts F, instead of through the hot air box D, the ducts F are caused to open near the bottom of the hot air chamber, as shown in Fig. 3. The piping within the hot air chamber B is arranged to drip each way, so that when a car is laid off, the water of condensation may be drained out by opening the cocks at the couplers. When a train is made up, the water of condensation is forced through the piping and out at the rear end of the rear car, where the valve is left open to allow the escape of the water.

In order to regulate the temperature within a car heated by my fruit car heating system, it is necessary to operate the valves E by means of a thermostat, which I usually arrange in connection with the rocking shaft L extending across each end of the car and connected by the crank arm V and suitable rods N to the valves E. The thermostat may be placed in contact with the end of the car about midway between the sides, so adjusted that the expansion of the diaphragms H containing a liquid whose boiling point is between 35° and 55° Fahrenheit, shall operate the rocking shaft L to close the valves E, thus shutting off the entrance of hot air from the hot air box. The rocking shaft L extends across the car and is usually a square piece of metal incased within a pipe $l$ suitably mounted at its ends with the sides of the air box D and supported near its center by means of the frame J.

In order that the car may be more quickly reduced in temperature, I place a valve G in the end of the car communicating with the exterior air, which valve is also connected by rod M to the crank arm V. The rod M is provided at its upper end with an elongated eye $m$ within which is placed the pin $g$, which is attached to the butterfly valve G. The crank arm V is also connected with the rod M by means of the spring buckle W; the rod N is secured to the butterfly valve E by suitable connections $n$; the spring buckle W is arranged in such a manner that when the rocking shaft is caused to revolve by the expansion of the diaphragms, the crank arm V will be raised, which will cause the butterfly valve E to close and the rod M will be raised; the pin $g$ will come in contact with the lower end of the eye $m$ and the butterfly valve G will be opened. The spring $w$ on the spring buckle W will be acted upon and will be contracted when the butterfly valve G is open, thus allowing for the upward movement of the rod M after the butterfly valve E has been closed. It will be noticed that the butterfly valve E will be closed before the butterfly valve G will be opened. The construction of the eye $m$ on the rod M allowing it to reciprocate along the pin $g$ and if the closing of the butterfly valve E is sufficient to reduce the temperature, the butterfly valve G may not be opened at all.

The thermostat may be constructed as shown in the drawings, of a series of diaphragms H consisting of copper plates soldered together along their edges and containing a liquid whose boiling point is between 35° and 55° Fahrenheit and provided with threaded lugs $h\ h'$ on their sides by which they are attached together and mounted within a frame J by the bracket $j'$ and connected with a lever K pivoted to the frame J at $k$, and operating the rocking shaft L; or it may be constructed in any suitable manner.

I do not intend to cover in this application, the device claimed for temperature regulator in my application Serial No. 469,698, filed April 10, 1893.

What I do claim as my invention, and desire to secure by Letters Patent, is—

In a fruit car-heating system, a hot air chamber placed beneath a fruit car, a series of pipes placed within said hot air chamber, a train pipe communicating with said piping in said hot air chamber, a hot air box within the car communicating with said hot air chamber and also with the upper portion of the car, a thermostat placed within the car, a damper within said hot air box capable of being opened and closed by said thermostat, a cold air duct communicating with the lower portion of the car and with said hot air chamber beneath the car, a valve within the car communicating with the exterior thereof, said last mentioned valve opened and closed by said thermostat, substantially as described and for the purpose set forth.

JAMES F. McELROY.

Witnesses:
EDWIN A. SMITH,
WILLIAM P. EDDY.